United States Patent [19]

Goldie

[11] 4,044,357

[45] Aug. 23, 1977

[54] FM/CW RADAR INCLUDING A NOVEL RECEIVER PROTECTOR OF GENERAL UTILITY

[75] Inventor: Harry Goldie, Randallstown, Md.

[73] Assignee: Westinghouse Electric Corporation, Pittsburgh, Pa.

[21] Appl. No.: 637,493

[22] Filed: Dec. 4, 1975

[51] Int. Cl.$^2$ .............................................. G01S 9/24
[52] U.S. Cl. ............................... 343/17.5; 333/17 L; 333/24.2; 333/73 W
[58] Field of Search ................. 333/17 L, 24.2, 73 W; 343/14, 17.5

[56] References Cited

U.S. PATENT DOCUMENTS

| 3,283,321 | 11/1966 | Ward ....................................... 343/14 |
| 3,500,256 | 3/1970 | Carter et al. ......................... 343/17 L |
| 3,629,735 | 12/1971 | Carter et al. ......................... 333/17 L |
| 3,761,924 | 9/1973 | McGowan ..................... 343/17 L X |

*Primary Examiner*—T.H. Tubbesing
*Attorney, Agent, or Firm*—C. F. Renz

[57] ABSTRACT

An FM/CW radar system which uses a single duplexed antenna, in which high degree of isolation of the transmission signal from the receiver is provided by passive power limiter devices employing the subsidiary resonance mode of narrow linewidth ferrite materials. In devices which are magnetically biased for operation in the subsidiary resonance mode, strong r.f. fields resonantly couple to spin waves, thus causing power absorption for signals at the frequency of incidence which exceed a predetermined threshold. A signal exceeding the threshold is attenuated over a narrow band at the frequency of incidence while the weak FM/CW target echo return signals are transmitted to the receiver with very low loss, provided their frequency displacement is of the order of 15 MHz from the frequency of incidence.

16 Claims, 12 Drawing Figures

FM/CW RADAR INCLUDING A NOVEL RECEIVER PROTECTOR OF GENERAL UTILITY

BACKGROUND OF THE INVENTION

The invention herein described was made in the course of or under contract with the Department of the Air Force.

FIELD OF THE INVENTION

The present invention relates to FM/CW radars and, more particularly, to such radars of a type in which the transmitted signal and the target echo signal are duplexed through a single antenna. The invention also relates to a receiver-protector apparatus for radars which is of general applicability.

DESCRIPTION OF THE PRIOR ART

There is a great interest in the use of FM/CW type radar systems for airborne military radar systems because of their relative simplicity and reliability. However, one of the more serious constraints in the design and application of FM/CW radar systems is the required high degree of isolation of the transmitter from the receiver. Heretofore, it was impractical for an FM/CW radar to operate in the duplexed-active mode (transmission and reception through a common antenna) because of excessive feedthrough of transmission energy directly into the mixer. Prior art receiver protectors of the plasma, hybrid plasma/diode, diode and ferrite power absorber/diode types provide broadband isolation when operated at above-threshold power levels. Thus, the small target echo signals which are offset only slightly in frequency from the simultaneously present transmission signal is greatly attenuated by these prior art receiver protectors. Accordingly, prior to the present invention, FM/CW radar has been practical only when a separate receiving antenna is employed, and the physical spacing of the receiving antenna from the transmitting antenna is sufficient to provide the necessary isolation of the transmitter from the receiver. The latter solution (separate receiving antenna) causes severe problems in locating the system within normal aircraft aerodynamic profiles. As a result, prior to this invention, there has been negligible acceptance of the FM/CW radar as a design approach for military airborne radar applications.

In addition to an interest in FM/CW radar systems utilizing a single duplexing antenna arrangement, there is a continuing interest in improvements in radar receiver protector apparatus to achieve: (i) better spike voltage protection capability; (ii) lower microwave reflection at the input port; (iii) longer shelf life; and (iv) the independence from power supplies inherent in passive device modes of operation.

SUMMARY OF THE INVENTION

In accordance with the present invention, an FM/CW radar system operates in the duplexed-active mode through a single antenna. The r.f. carrier generation operates under the control of a conventional sawtooth modulator to provide an FM modulated carrier transmission signal. This signal is imparted to the input port of a duplexing circulator, which applies the transmission signal to the antenna for radiation, and applies the return target echo signal collected by the antenna to a target echo signal output port of the circulator. In accordance with the well known principle of operation of the FM/CW radar, the target echo signal is heterodyned with a small fraction of the transmission signal to derive a best frequency signal which contains the radar target intelligence. However, there is considerable leakage of the transmitter signal to the target echo signal output of the duplexing circulator. In accordance with the present invention, the signals at this output port are transmitted to the mixer through a receiver protector assembly which employs spin wave resonance absorption effects of narrow linewidth ferrite materials to reduce the transmission leakage power to values which substantially eliminate intermodulation products and harmonic distortion in the mixer while simultaneously allowing target signals to be transmitted with acceptably low loss (of the order of 1.5 dB). The assembly is composed of three stages. The first stage is a high power absorptive limiter consisting of a construction of magnetically biased spaced slabs or bars of a narrow linewidth ferrite materials. Edge surfaces of the bars are exposed to tangential propagation of the microwave energy. The second stage is a construction of spaced small-sized (0.02 in., or 0.05 cm. diameter) spheres, which are magnetically biased, and which further each have an associated dielectric resonator structure consisting of a surrounding annular disc of high dielectric, high permissivity material. The sphere and dielectric resonator structures are longitudinally spaced in the microwave propagation path. The third stage is a variable frequency, narrow band stop filter arrangement in which such small-sized spheres of narrow linewidth ferrite material are supported in resonator cavities, and are actively driven by a signal in accordance with the output of the FM/CW radar modulator driving a magnetic field winding. This causes the narrow band stop frequency to synchronously track the FM/CW radar transmission signal frequency. The first two stages operate on the principle of spin wave power absorption in the so-called subsidiary resonance mode of such ferrite materials. A characteristic of this type of operation is that the microwave energy fields resonantly couple to the spin waves, and thus cause power absorption, but only if the microwave energy signal exceeds a predetermined threshold. Further, the above-threshold signals are attenuated only over a narrow band at the frequency of incidence, while below-threshold signals are transmitted with very low loss, provided they are displaced from the above threshold signal by a frequency of displacement at least of the order of magnitude of 5 MHz in the X-band (3.2 to 12.4 GHz). The synchronously tracking stop filter rejects the transmission energy passing through the limiter stages. Target echo signals are below the threshold of the limiter stages and are generally displaced in frequency from the transmission signal by more than 5 MHz. This allows target signals to pass through the limiters and the stop filter with acceptably low loss.

DESCRIPTION OF THE PREFERRED EMBODIMENT

Figure 1:
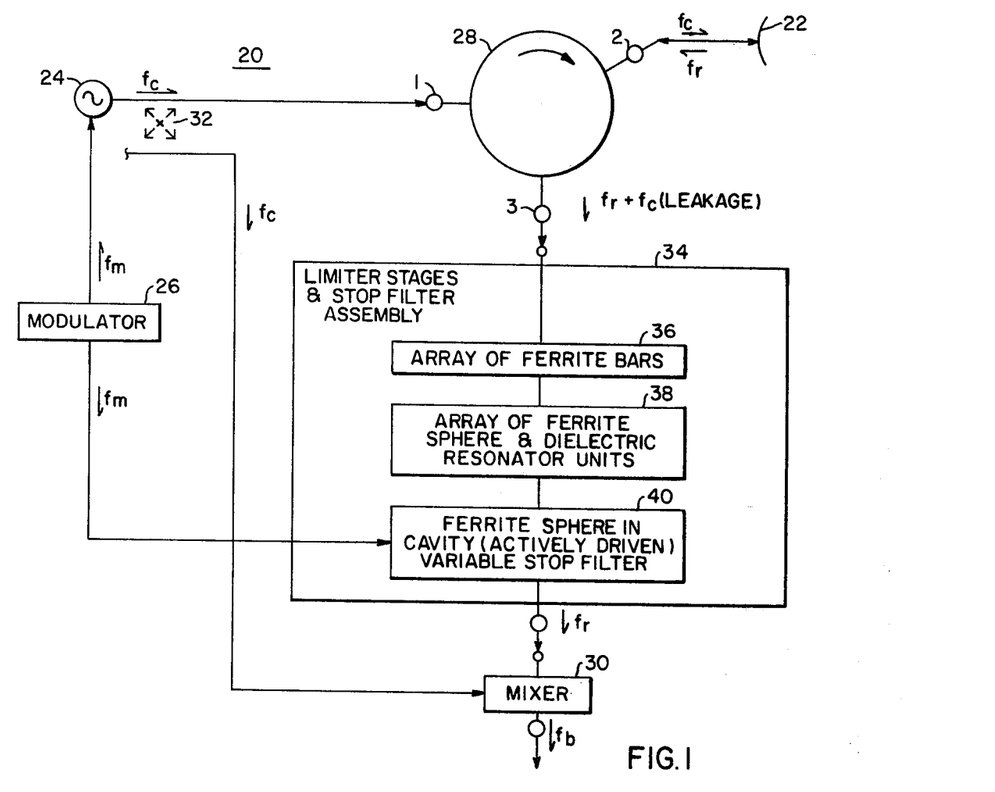
FIG. 1 is a block diagram of an FM/CW radar system utilizing a single duplexed antenna.

Referring now to the drawing, and in particular to FIG. 1, a frequency modulation/carrier wave (FM/CW) radar system 20 which utilizes a single antenna 22 for both transmission and reception is constructed in accordance with the present invention. The r.f. generator 24 is under control of a sawtooth modulator 26 to provide the radar transmission signal. For purposes of illustration, it is assumed that modulator 26 operates at a modulation frequency, $f_m$, of 1.0 KHz causing the output of the r.f. generator, $f_c$, to vary as a sawtooth function of time between 11.00 and 11.75 GHz. It is further assumed that the output power level of generator 24 is 300 watts of continuous (cw) signal output. A conventional three-port duplexing circulator 28 enables antenna 22 to be used in a duplexed mode. Circular 28 has three ports, designated 1, 2 and 3. The output of generator 24 is applied to port 1. In accordance with the well-known principles of operation of three-port duplexing circulators, signal $f_c$ is coupled to port-2 and thence applied to antenna 22 for radiation toward the target area. The target echo signal, $f_r$, received by antenna 22 is applied to port-2 of circulator 28, and the circulator 28 operates to cause the target echo signal to appear at its port-3, which is the target echo signal output of the circulator. It is assumed that the antenna has a VSWR of 2 so that reflected power is 10% of the transmitter output signal, $f_c$, and appears at port 3 along with the target echo signal $f_r$. This amount of reflection is normal in state of the art radar systems having an antenna voltage standing wave ratio (VSWR)=2. This means that a 30 watt cw signal is present at port-3 along with the much smaller target echo signal, which typically is in the amplitude range of $-30$ to $-130$ dBm. In accordance with the well-known principles of FM/CW radar, the radar intelligence is derived by a mixer 30 which heterodynes the target echo signal with a local oscillator input consisting of small fraction of the instantaneous radar transmission signal. The fraction of the transmission signal is obtained in any suitable manner, such as by a directional coupler 32. The output of the mixer, or beat frequency, $f_b$, contains the target information intelligence. The beat frequency for a sawtooth modulation is:

$$f_b = (2R/c)(2\Delta f \cdot f_m)$$

where $R$ is range, $c$ is speed of light, $\Delta f$ is frequency deviation, and $f_m$ is the modulating frequency. For a range of 500 to 50,000 meters $f_b$ will be 5 MHz for 0.5 Km targets and 500 MHz for 50 Km targets. In practical embodiments, range switching may be employed by varying $f_m$ and/or $\Delta f$.

Figure 2:
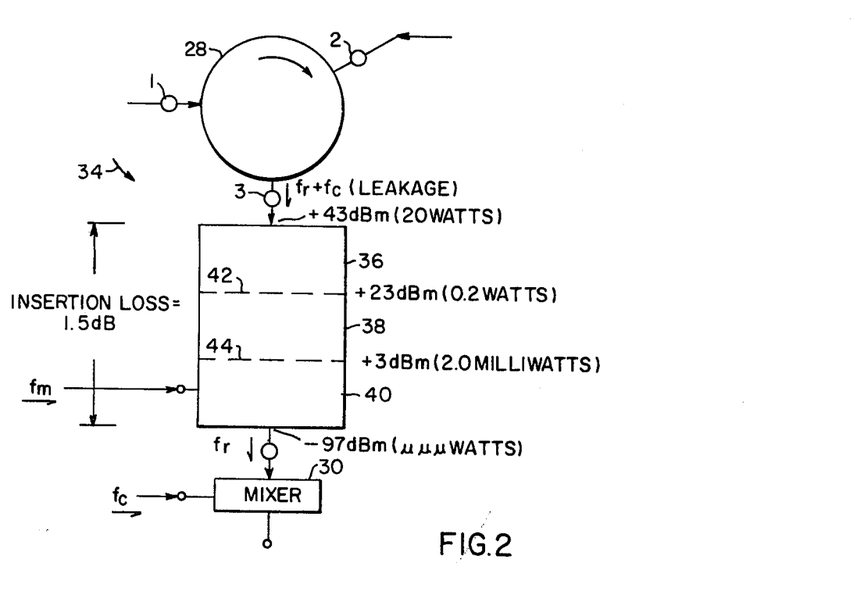
FIG. 2 is a diagrammatic representation of signal isolation effects and insertion losses present in a portion of the system of FIG. 1.

In accordance with the present invention, port-3 of circular 28 is coupled to the input of mixer 30 through a limiter stages and stop filter assembly 34. Assembly 34 consists of three stages or sections comprising an array of ferrite bars 36, an array of ferrite sphere and dielectric resonator units 38, and a ferrite sphere in cavity variable stop filter 40. The relative magnitudes of attenuation of the leakage radar transmission signal provided by the respective stages of assembly 34, and the insertion loss to which the target echo signal is subject is diagrammatically depicted in FIG. 2. As will be explained in subsequent detailed description of arrays 36 and 38, they each have an associated threshold of power limiting represented by dashed lines 42 and 44, respectively. Assume that the transmission frequency signal appearing at port 3 has a power level of $+43$ dBm (or 20 watts). Power limiting action of the order of 20 dB is provided by the ferrite bar array 36, so that the leakage signal at the output thereof will have a value in the range of 23 dBm (0.2 watts to 3.0 watts). Ferrite sphere and dielectric resonator unit array 38 provides another increment of power limiting of the order of 20 dB, so that the transmission signal leakage at its output side is $+3$ dBm (2.0 milliwatts). Arrays 36 and 38 are passive devices, but variable stop filter 40 must be actively driven by a signal in accordance with the output of sawtooth modulator 26, $f_m$, in order to provide narrow band stop filter operation at the instantaneous frequency of the signal present at port-3 of circulator 28. The variable stop filter stage 40 provides 100 dB of attenuation, so that the transmission leakage signal at its output side is $-97$ dBm. Meanwhile, because of unique amplitude threshold-frequency selective characteristics of the ferrite bar array 36 and of the ferrite sphere and dielectric resonator unit array 38, and because of the narrow bandwidth of variable stop filter 40, the target echo signals which are below the threshold of stages 36 and 38 will be coupled from port-3 of circulator 28 to the input of mixer 30 with an insertion loss of the order of 1.5 dB. Thus, limiter stages and stop filter assembly 34 is effective to allow the low threshold target echo signals to be received by mixer 30 with low loss while simultaneously attenuating the above-threshold transmission leakage signal to amplitudes which do not cause receiver burnout or receiver desensitization.

Figure 3:
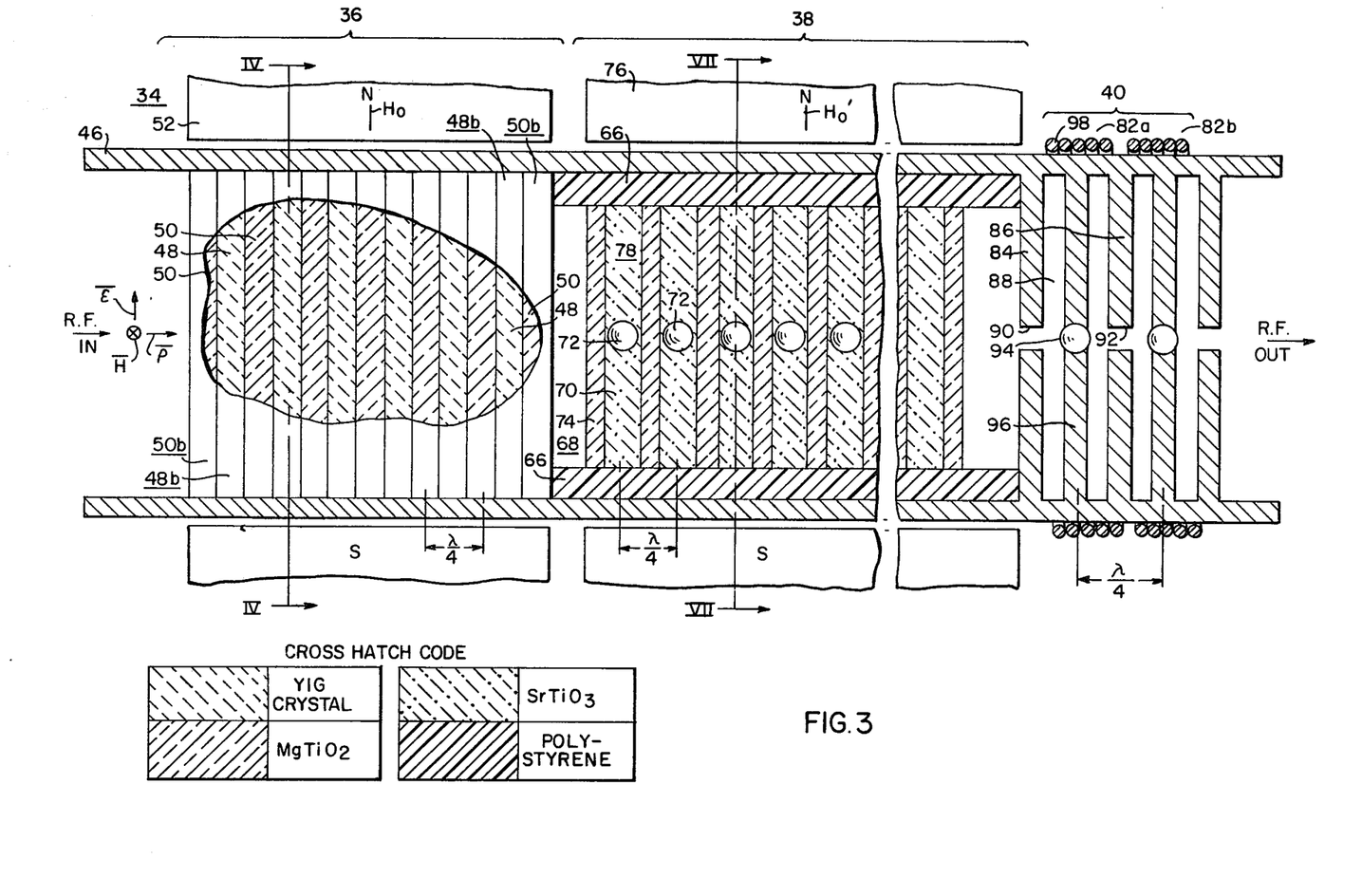
FIG. 3 is a central section through the limiter stages and stop filter assembly of FIG. 1, a certain portion being cut away.
Figure 4:
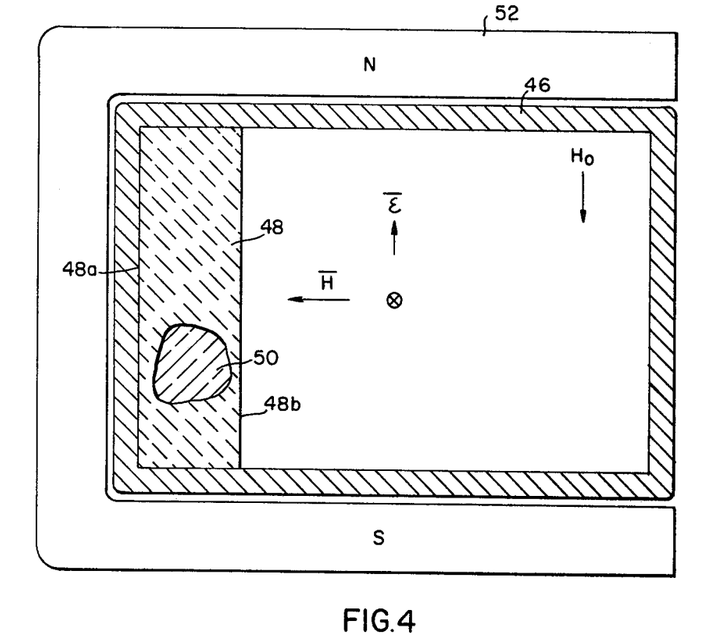
FIG. 4 is a section of FIG. 3 taken along lines IV–IV, a certain portion being cut away.

Referring now to FIGS. 3 and 4, assembly 34 comprises a length of rectangular cross-section waveguide 46 having input and output ends. The r.f. or microwave energy propagates through waveguide 46 in a mode in which: (i) the direction of electric field $\overline{e}$ extends in the direction of the minor dimension of the waveguide cross-section; (ii) the direction of magnetic field, $\overline{H}$ extends in the direction of the major dimension of the waveguide cross-section; and (iii) the direction of propagation $\overline{p}$ extends along the direction of propagation through the waveguide. This is symbolically shown in FIG. 3 at the input end of the waveguide. The length of waveguide 46 is divided into a ferrite bar array section or stage 36, a sphere and dielectric resonator unit array section or stage 38, and a ferrite sphere and cavity type variable stop filter section stage 40, which have been hereinbefore referred to in conjunction with FIGS. 1 and 2.

A stack of slab-like members or rectangular bars alternately consisting of single crystal yttrium-iron-garnet (YIG) bars 48 and magnesium titanate (MgTiO$_2$) bars 50, which are mounted at one side of the interior of waveguide 46. Their major faces are aligned in transverse relationship to the waveguide axis, with one of their long edges 48a, FIG. 4 contigous to a minor dimension inner wall of the waveguide. The MgTiO$_2$ bars 50 serve as dielectric spacers. The YIG bars 48 and the dielectric spacer bars 50 have their thickness dimensions chosen to form a quarter-wavelength ($\lambda/4$) array of YIG bars edge surfaces 48b (i.e. the surfaces of bar 48 which confront the reader in FIG. 3) where $\lambda$ is the apparatus operation wavelength. The microwave energy carried by the waveguide has a direction of propagation which tangentially passes across the array of edge surfaces 48b. A permanent magnet 52 provides a biasing magnetic field H$_O$ having its direction parallel to the direction of electric field $\bar{\epsilon}$ of the propagating microwave energy, and a magnitude in the range 1200 to 1400 gauss. The edge surfaces 48b of the YIG bars and the corresponding edge surfaces 50b of the dielectric spacer bars are polished to provide a joint surface having a smoothness of the order of $\pm$ 100A ($\pm$ 0.4 microinches). The stack of alternating slabs of bars 48 and 50, and magnet 52 form a periodic array of YIG surfaces 48b.

The bias field H$_O$ biases the YIG material of the array for spin wave power absorption in the subsidiary resonance mode of spin wave excitation. The theory of this is well known. (See. H. Suhl "Non-Linear Behavior of Ferrite Materials," PROC IRE, Vol. 44 (1956). In accordance with this conventional theory, the YIG material has a characteristic threshold of minimum power of r.f. or microwave energy necessary to excite spin waves. When the microwave energy having a strength above this threshold passes across the exposed edges 48b of the YIG bars, their r.f. fields resonantly couple to spin waves, thus causing power absorption, but only at the frequency of incidence.

Figure 5:
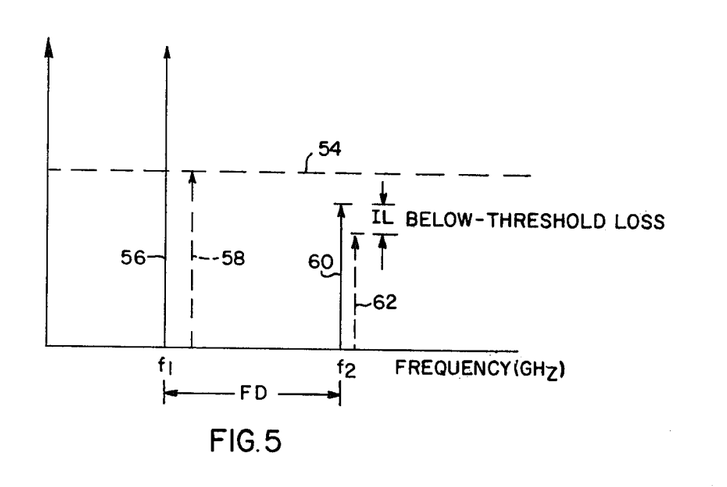
FIG. 5 is a diagrammatic depiction of the threshold and frequency selective characteristics of the array of ferrite bars.

The resulting frequency selective characteristic of this subsidiary resonance mode absorption effect is diagrammatically depicted in FIG. 5, wherein dashed line 54 represents the threshold. A signal $f_1$ of a power level in excess of the threshold, as indicated by solid line arrow 56, is limited to an amplitude corresponding to the threshold level at the output of section 36, as indicated by dashed line arrow 58. However, for a simultaneously incident signal at a frequency $f_2$ which is of a power level below threshold 54 and which is separated from $f_1$ by a frequency displacement, FD, in the range of 10-30 MHz, the attenuation is relatively low. For example, a single having a power level indicated by solid line arrow 60 at the input of section 36 is attenuated to a power level indicated by dashed line 62 at the output of section 36, resulting in a relatively low insertion loss IL. Stated another way, the characteristic of the subsidiary resonance mode of spin wave excitation of narrow linewidth ferrite materials, such as the YIG bar, operates to attenuate a signal having a power level which exceeds a predetermined threshold, but to pass with relatively low attenuation another signal having a power level which is below the predetermined threshold and which is of a frequency displaced from that of the above-threshold signal in the range 10–30 MHz. In the case of below-threshold signals with frequency displacements in excess of 30 MHz, the attenuation by spin wave power absorption effects become negligible.

Subsidiary resonance absorption limiting occurs because of non-linear coupling between the uniform precession resonance $\omega_{RES}$ and spin waves at one half this frequency. The spin waves are excited in pairs at angle $\theta_k$ from the d.c. biasing field H$_O$. There are manifold possible spin wave frequencies for a particular H$_O$. In general, the lower modes are more easily excited and have the lowest spin wave linewidth. The r.f. magnetic field at which catastrophic spin wave excitation occurs (which in turn causes the power absorption) is called the critical field $h_{CRIT}$. To achieve low threshold and thus provide low output limited power levels, the FMR precessional linewidth, $\Delta H_k$, should be minimized. H$_O$ should be provided in the 1200–1400 gauss range previously described.

It has been found that surface irregularities of edge surfaces 48b of YIG bars 48 cause linewidth broadening and increased insertion loss. Therefore the previously described high degree of polish ($\pm$ 100A) of the edge surfaces of bars 48 and 50 of section 36 is preferable. As will be understood by those of average skill in the art to which the invention pertains, the dielectric constant of spacer bars 50 determines the propagation velocity of microwave energy therethrough, and therefore determines the physical $\lambda/4$ spacing of YIG bars 48. As will also be understood by those of such average skill, the physical spacing provided by the dielectric bars 48 provides a variable parameter for control of the impedance match at the input end of section 36, in order to match the output impedance of port-3 of circulator Another important aspect of presence of the dielectric spacers 50 is that their presence provides a more favorable demagnetizing factor than would be available in a single large block YIG (or other ferrite material). The separation of the YIG (or other ferrite material) into a number of slabs or bars permits each slab or bar to precess in the uniform mode at independent phase angles. The significance of a more favorable demagnetization factor will be seen from an analytical description of the power absorption (limiting) phenomenon, to wit: coupling of signal power which is above the threshold of power necessary to excite spin waves in the slabs or bars at the frequency 0.5 $f_S$ to spin waves of frequency $f_S$ propagating at an angle of 45° from the appied bias field H$_0$ provides the power absorption (limiting) mode.

Figure 6:
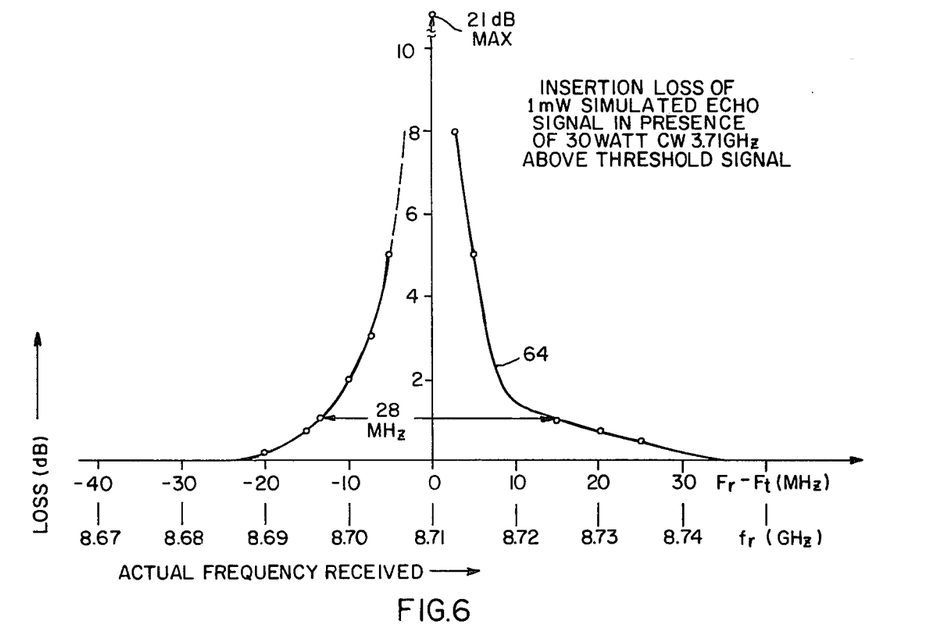
FIG. 6 is a curve of the frequency selective insertion loss characteristics of the array of ferrite bars of FIG. 3 for below-threshold signals.

The testing of an experimental embodiment of array 36 has resulted in 0.3 watt threshold power levels. The frequency selectively characteristics of this experimental embodiment for the case of a 1 mW simulated echo signal in the presence of an 8.71 GHz signal having a power level above the array's threshold is shown by curve 64 of FIG. 6. As indicated therein, the array provides an insertion loss in excess of 1 dB when the 1 mW signal is within a band of $\pm$15 MHz of the 8.71 GHz signal.

On the basis of the test results with the experimental embodiment, and the extrapolation of results based on the known theory of the subsidiary resonance mode of spin wave power absorption, it is believed that array stage 36 can provide power limiting up to tens of kilowatts over a 20 to 30 dB dynamic range.

An array stage 36, but which achieves a somewhat diminished capability, can be constructed with the substitution of the less costly polycrystalline YIG bars in place of all or some of the single crystal bars. One experimental embodiment in which polycrystalline bars were used throughout provided a threshold of 2.8 watts. Other narrow linewidth ferrite materials would work also.

The percentage of fill of the cross-sectional area of the wavelength which the slab or bar elements 48 provide is not critical. The size of slabs or bars 48 in FIG. 4 happens to be a form in which these materials are commercially obtainable. Larger slab structures could be substituted, up to a fill ratio of 50%.

Figure 7:
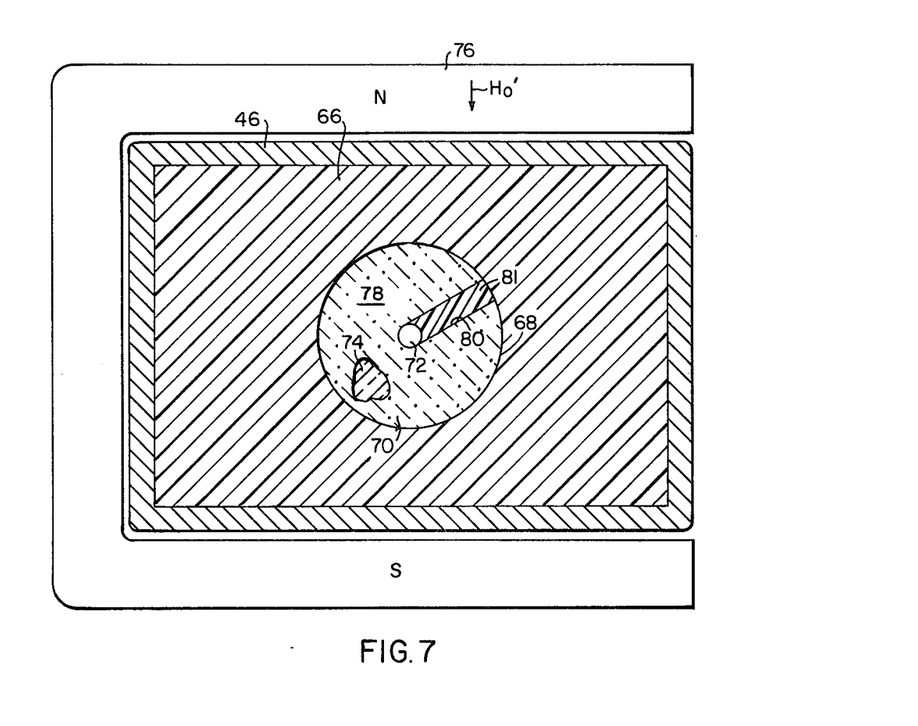
FIG. 7 is a cross-section of FIG. 3 taken along lines VII—VII.

Reference is now made to FIGS. 3 and 7 for the details of construction of the array of sphere and dielectric resonator units of section 38. A filler member 66, made of a material which exhibits low r.f. loss, has a cylindrical bore 68 formed between its opposite ends. Bore 68 is aligned with the center axis of waveguide 46 and serves to receive a stack of transversely extending disk-shaped elements alternately consisting of: (i) disks 70 of strontium titanate ($SrTiO_3$) containing at its center a polished single crystal YIG sphere 72 of a diameter of 0.02 inches (or 0.05 cms), and (ii) dielectric spacer disks 74 of magnesium titanate ($MgTiO_2$). The thickness of disks 70 and 74 are so chosen that YIG spheres 72 are spaced apart by $\lambda/4$ electrical distances. A permanent magnet 76 provides a magnetic bias field having a direction parallel to the direction of the electrical field $\bar{\epsilon}$ of the propagating microwave energy, as indicated by arrow $H_0'$. The magnitude of magnetic field $H_0'$ is in the range 1200–1400 gauss. The strontium titanate ($SrTiO_3$) material of which disk 70 is made is a dielectric having a high magnetic permitivity of 300. Together, each $SrTiO_3$ disc 70 and its associated YIG sphere 72 constitute a so-called dielectric resonator unit 78 which concentrates the r.f. magnetic field of propagating microwave energy at the surface of sphere 72 to enhance the coupling of such field with the surface of YIG sphere 72. Stated another way, the $SrTiO_3$ disc functions as a magnetic field shaping element. The stack of alternating disk elements 70 and 74 and magnet 76 form a periodic array of dielectric resonator units 78. A typical number of dielectric resonators contained in such array is fifteen. An example of a suitable material for low r.f. loss filler 66 is polystyrene. As shown in FIG. 7, the implantment of the YIG spheres 72 at the centers of disks 70 is done by drilling a radial bore 80, inserting the sphere 72, and filling the bore with any plastic cement 81 which has suitable r.f. progagation properties.

The periodic array of dielectric resonators functions as a medium power limiter using the subsidiary resonance spin wave power absorption effects which occur at the surface of the YIG spheres 72. This type of power limiter is known in the art. An example of a disclosure of this type of limiter is the publication by Scott S. Elliot, in "Abstracts of the 19th Conference on Magnetism and Magnetic Materials Digests of Presentations, Nov. 13–16, 1973." Like the previously described array of YIG and dielectric spacer bars 48 and 50 of section 36, the power absorption is produced by r.f. fields resonantly coupling to spin waves in a small linewidth ferrite material biased to the subsidiary resonance mode. Accordingly, the power threshold and frequency selective characteristics described in conjunction with section 36 are also applicable to the array of section 38. However, the enhancement of the coupling of magnetic fields to the spin waves of the surface of the YIG sphere 72 by the dielectric resonator units 78 results in power thresholds of the order of 3 dBm (2.0 milliwatts) and below. The high permitivity of disc 70 enhances the field coupled to the spheres by $\epsilon^{3/2}$ over a similar metal cavity. The $TE_{101}$ mode of the cylindrical disc dielectric resonator is particularly suited since it has a maximum magnetic field at the center and an electric field of zero. The bandwidth and group velocity are controlled by the periodic spacing of the spheres. The minimum r.f. magnetic field power level at which catastrophic spin wave excitation, $h_{CRIT}$, occurs for a sphere at $\omega_S$ is:

$$h_{CRIT} = \frac{2\omega_S \Delta H_K (\omega_S - \omega_{RES})}{\omega_M (\omega_S/2 + \omega_{RES} - \omega_M/3)}$$

To achieve low thresholds and thus provide low output limited power levels, $\Delta H_k$ should be minimized and the magnetic saturation $M_S = \omega_M/2\gamma$ should be maximized, where $\gamma$ is the gyromatic ratio. This equation only holds near the biasing condition $\omega_K = \omega_S/2$. It will be apparent that the 0.020 inch diameter spheres of the medium power array of section 38 provide substantially less surface area for spin wave absorption phenomena than the edges 48b of the slab of bar elements 48 of the high power array of section 36. For this reason, the medium power array is sometimes referred to as a distributed power absorption array in contrast to the term "bulk limiter" applied to the high power array.

It has been found that the input sphere of the low power array has an overload limit of the order of 3 watts. A power limiting capability of 20–30 dB is achievable with a 20% instantaneous bandwidth. An array of 15 spheres will provide 10% bandwidth with a 0.4 dB insertion loss for below-threshold signals offset or displaced from an above-threshold signal by 15 MHz or more, in the X-band of radar frequencies.

An alternate material for spheres 72 is lithium ferrite ($LiFe_2O_8$). The dielectric resonator disk 70 is made of $SrTiO_3$ because of the favorable low r.f. loss characteristic of this material. However other materials characterized as high dielectric, high permitivity materials should be substituted.

Reference is again made to FIG. 3, this time for the details of construction of actively driven variable stop filter section 40. Section 40 is comprised of two tandem connected units 82a, 82b, which are commercially available from Watkins-Johnson Corporation of Palo Alto, Calif. Each unit is identical so only the first unit 82a will be described. This description is based upon the physical examination of a commercially known unit and may not be fully accurate or complete. Unit 82a comprises transverse end walls 84 and 86 which form a resonator cavity 88 having an elecrical length of $\lambda/4$. Walls 84 and 86 have iris openings 90 and 92. A sphere of YIG material 94 is supported in the center of cavity 88 by means of a support disc 96 made of low r.f. loss materials. Unit 82a includes a magnetic bias winding 98, and in operation is actively driven by a current signal through this winding, which is a signal in accordance with output $f_m$ of the sawtooth modulator 26, as shown in FIG. 1. Unit 82a is a variable frequency narrow band stop filter, and the instantaneous stop band center frequency thereof synchronously tracks the FM/CW radar transmission signal frequency in response to the drive applied to winding 98. It is believed that units 82a and 82b operate on the principle of power absorption through coupling to spin waves excited on the surface of sphere 94. However, in this instance the excitation of resonant spin waves is produced by the coincidence resonance mode, rather than the subsidiary resonant mode. The coincidence resonance mode is another mode of spin wave excitation in narrow linewidth ferrite materials which is discussed in the previously cited publication of H. Suhl. Each unit 82 provides a 50 dB stop band loss over extremely narrow bands with an out-of-band loss 0.3 dB, so that section 40 made up of two of these units yields 100 dB stop band loss with a 0.6 dB out-of-band loss.

Figure 8:
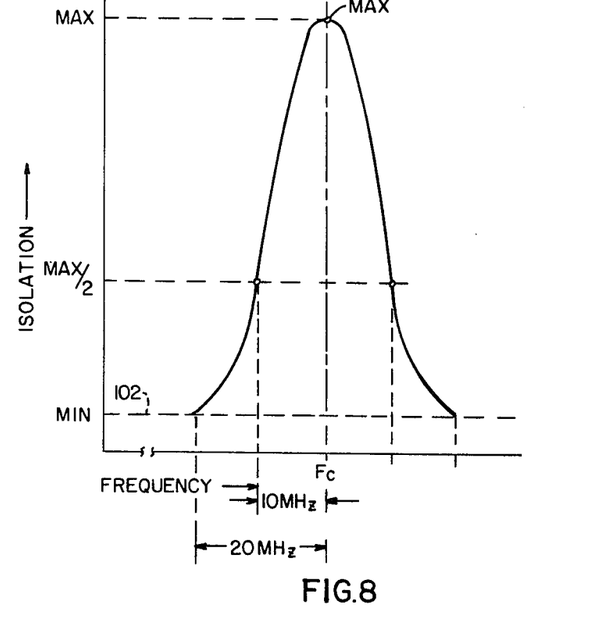
FIG. 8 is a curve representing the isolation characteristics of the limiter stages and stop filter assembly of FIG. 3.

The overall isolation vs. frequency characteristic of assembly 34, including the combined effects of power limiter stages 36 and 38, and of actively driven variable, narrow band, stop filter 40 is shown by curve 100 of FIG. 8. This curve represents the isolation capability of assembly 34 with the presence of an incident transmission output frequency leakage signal $f_c$ (leakage) at a power level above the minimum power threshold of the ferrite bar array stage 36. The maximum isolation occurs at frequency $f_c$. For signals displaced 10 MHz above or below frequency $f_c$, one-half the maximum isolation is provided, and for signals offset or displaced by 20 MHz the isolation is the minimum isolation, dashed line 102, of the assembly 34. This minimum isolation is the accumulated value of intrinsic material losses in the successive stages, which is of the order of 1.5 dB. Further, this characteristic is broadband because the phenomena of limiting microwave power by spin wave excitation in stages 36 and 38 is fundamentally a broadband phenomenon. Assembly 34 achieves a bandwidth of the order of 500 MHz centered at $f_c$. (Cylindrical cross-sectioned waveguide configurations, to be discussed as an alternate embodiment in connection with FIG. 9, will provide even higher bandwidths.) Accordingly, that this isolation vs. freqency characteristic does in FM/CW radar system 20 is to allow below-threshold echo target signals, $f_r$, to be received with acceptably low loss while simultaneously limiting the above-threshold transmission output leakage signal, $f_{c(leakage)}$, to reduce the same levels which protect the receiver from the burnout and the desensitization by third order intermodulation products and mixer harmonic distortion. Stated another way, the exemplary (in the discussion of FIG. 2) 143 dB of isolation provided by limiter stages and stop filter assembly 34, and an exemplary 17 dB of isolation provided by circulator 28, results in accumulative reduction of carrier leakage power of $-160$ dB, which is conventionally regarded by workers in the art as adequate to reduce single antenna FM/CW radar leakage signals. Simultaneously, the below-threshold frequency-offset target signals are allowed to be received with a loss of the order of 1.5 dB, which is regarded by workers in the art as adequate for FM/CW radar systems.

It will be appreciated that the described isolation vs. frequency characteristic of assembly 34 complements the amplitude vs. deviation-of-echo-signal-frequency of FM/CW radar systems. Target echo signals which provide the least displacement are from the close-in targets and have the largest amplitude. These can withstand the larger levels of isolation.

Among the other advantages of FM/CW radar system 20, and particularly of its unique receiver protector assembly 34 are:

1. The high power ferrite bar array 36 which is the input of assembly 34 is an absorptive device. Therefore, a minimum microwave reflection occurs at the point of coupling into the receiver protector channel, which in turn enables the use of a three-port duplexing circulator rather than a four-port circulator. As will be appreciated by those of skill in the art to which this invention pertains, three-port circulators have lower loss, wider instantaneous frequency, and are substantially more compact than four-port circulators. Also, virtually unlimited operating life and shelf life can be obtained utilizing a three-port duplexing circulator when average power levels are moderate.

2. Assembly 34 is amenable to high modulation rate $f_m$ for both below and above threshold signals enabling, for example, frequencies to be swept from 9.05 to 9.55 GHz in 100 microseconds without altering the limiting threshold, dynamic range or frequency selectivity of assembly 34.

3. The ferrite bar array stage 36 and the sphere and dielectric resonator unit array stage 38 are passive, requiring no power supply.

4. The ferrite bar array 36 offers fast-acting high power handling capability, which is desired as a general purpose receiver protector characteristic in achieving low spike leakage for any type of system.

Figure 9:
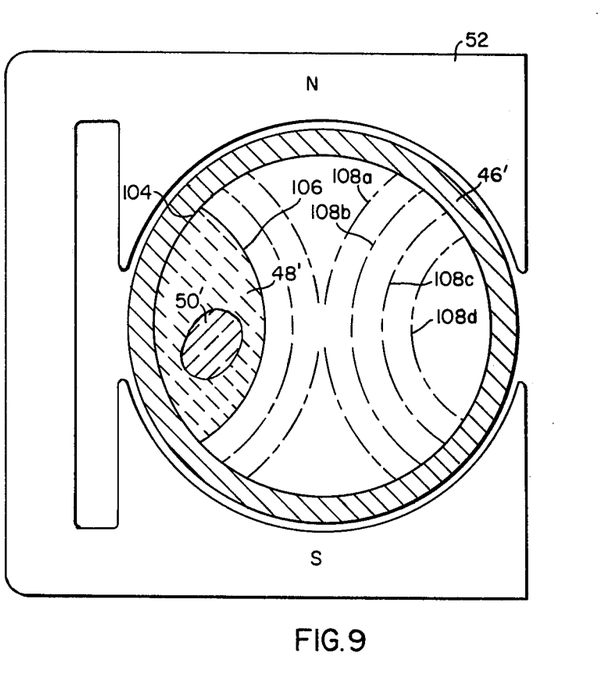
FIG. 9 is a section like that of FIG. 4 for an alternate construction of the array of ferrite bars of FIG. 3.

Reference is now made to FIG. 9 for a description of an alternate embodiment of limiter stages and stop filter assembly employing a circular cross-sectioned waveguide 46'. (Since the only basic difference of construction is in the shaping of the elements of the ferrite slab array, the only view of the embodiment which is shown is a cross-section like that of FIG. 4.) The high power periodic array stage is constructed as a longitudinally extending stack of alternate slabs of single crystal YIG material 48', and slabs of $MgTiO_2$ material 50' which serve the same function as the rectangular bars 48 and 50 in the embodiment of FIG. 3. the shapes of slabs 48' and 50' are identical, and therefore the description of slab 48' will be sufficient for both. Slab 48' is shaped as a fragment of a circular disc corresponding to the cross-sectional area of the interior of waveguide 46'. One of its edge surfaces 104 has an arcuate shape to match the inner circumference of the waveguide wall, and the stack of slabs are mounted with their corresponding edge surfaces contiguous the wave wall. All the slabs of the array are aligned longitudinally along the waveguide length. The remainder of the edge surface of slab 48' forms a certain outwardly convex curve 106, which has the shape of the well known family of isopotential electric field lines, phantom lines 108a, 108b, etc.

Figure 10:
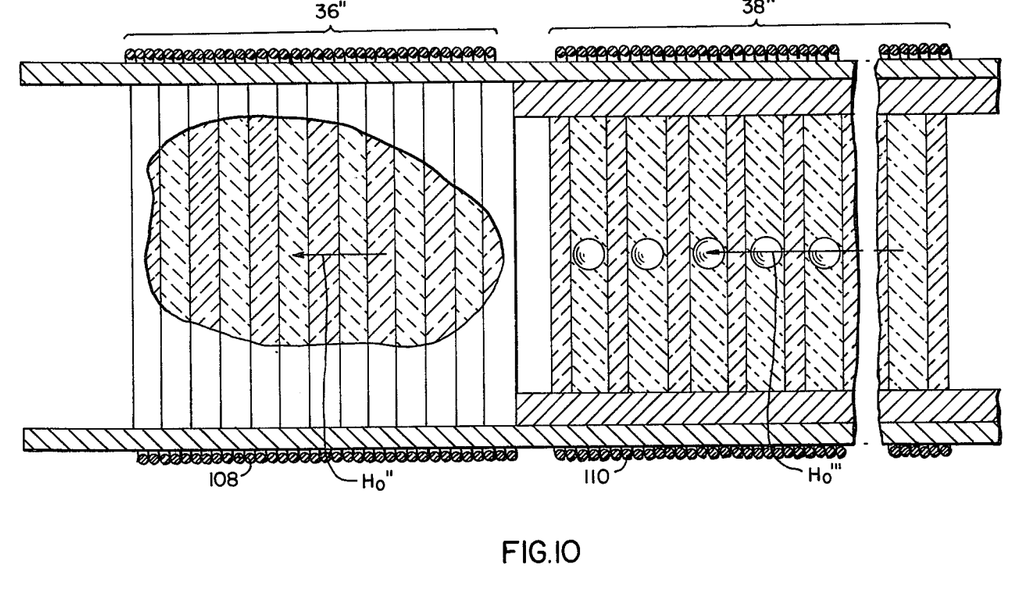
FIG. 10 is a longitudinal section like FIG. 3 for an alternative construction of the limiter stages of the limiter stages and stop filter assembly of FIG. 3.

Reference is now made to FIG. 10 for another alternate embodiment of limiter stages and stop filter assembly in which the bias magnetic fields $H_0''$ and $H_0'''$ for the magnetic bar array section 36' and the sphere and dielectric resonator unit section 38'', respectively, are provided by current windings 108 and 110, respectively. Magnetic bias fields $H_0''$ and $H_0'''$ extend in a direction parallel to the direction of microwave propagation, which according to known theory, is another direction for magnetic field which can bias linear ferrite materials for spin wave excitation in the subsidiary resonance mode.

Figure 11:
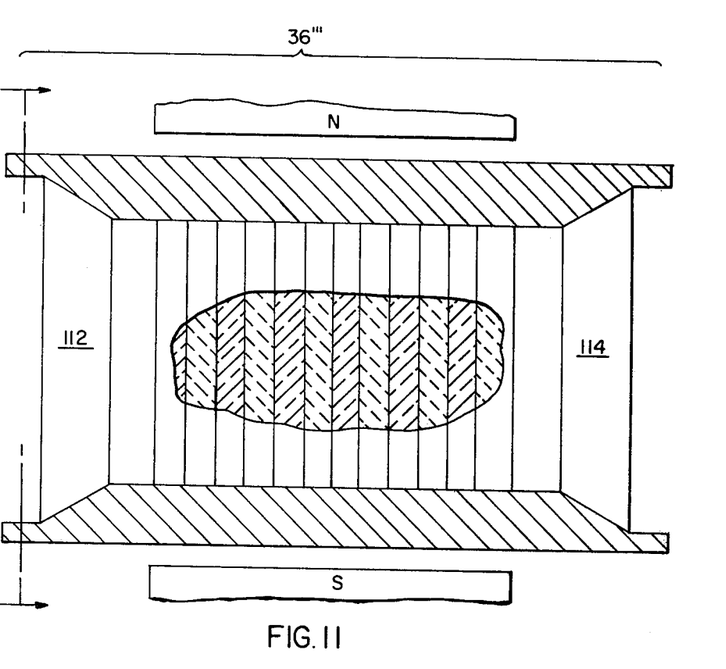
FIG. 11 is a longitudinal section of a modified embodiment of the array of ferrite bars of FIG. 3.
Figure 12:
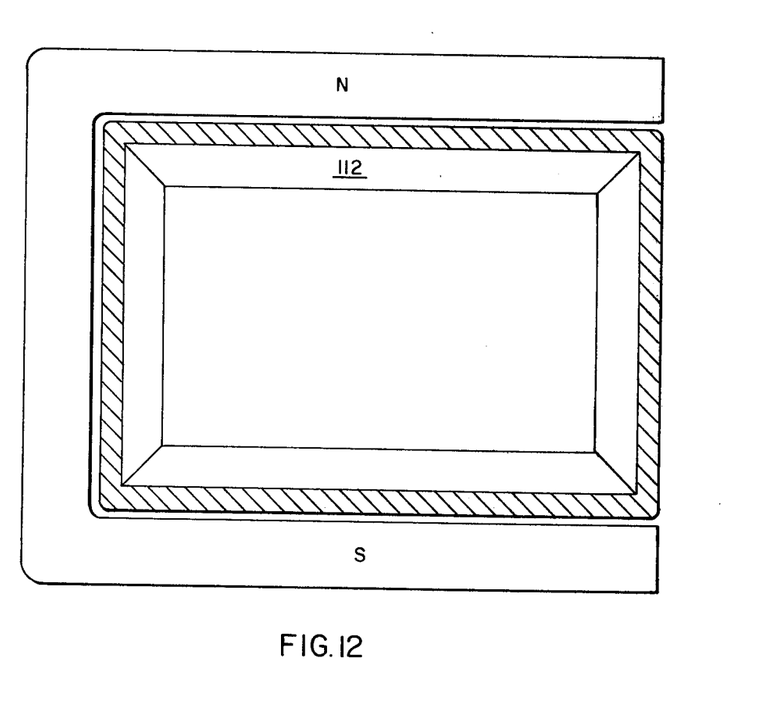
FIG. 12 is a section taken along lines XII—XII of FIG. 11.

In the embodiment of FIG. 3, the input impedance of the ferrite bar array stage 36 was matched to the output impedance of port-3 of circulator 28 by the choice of dielectric material of the dielectric spacer bars 50, to control the physical distance of separation of the YIG bars. However, in some instances, this will not be technically or economically desirable, and in these cases, the match can be achieved by the provision of converging and diverging rectangular cross-sectioned impedance transformer sections. This is illustrated in FIGS. 11 and 12 by array 36''' which has a converging input section 112 and a diverging output section 114 at its input and output sides. This enables matching to a circulator port and a medium power limiter having unequal impedances.

It has been noted that the frequency selective characteristic for below-threshold signals, provided by stages 36 and 38, of FIG. 3 which employ susidiary resonance mode spin wave absorption, complements the FM/CW radar system characteristic of higher amplitude echo target signals at the shorter ranges. However, in the event that the higher attenuation suffered in the case of target echo signals from close-in targets creates an unsatisfactory target discrimination situation, the well known sensitivity time control (STC) technique could be employed by tailoring the filter skirt attenuation characteristics of assembly 34 to provide an appropriate STC function, as will be understood by those having average skill in the art to which the invention applies.

Althogh the limiter stages and stop filter assembly 34 is disclosed herein as component of an FM/CW radar system, it and certain components thereof have special utility in other types of systems, and also have utility as general purpose receiver protector apparatus.

One example of a special utility for assembly 34 is in fire control radar system having a continuous wave (CW) missile guidance frequency offset from the main transmitter frequency. Heretofore, an offset of 6 or 7% (600 MHz in the X-band) has been necessary. This relatively wide separation of the two frequencies forces use of wideband microwave components, and also limits frequency agile operation of both transmitter frequencies to achieve more secure operation. By replacing the prior art reject filter with the limiter stage and a stop band filter assembly of the present invention, these limitations may be avoided. In making such a substitution the stop filter would track the CW frequency.

An example of a general purpose utility of stages 36 and 38 is in a low noise passive electronic counter measure (ECM) receiver operatively associated with an active radar. The YIG bar array stage 36 and the ferrite sphere and dielectric resonator unit stage 38 may be employed as a general purpose receiver protector to offer cw and pulsed signal rejection of signals above threshold while simultaneously allowing weak information-bearing carriers to pass through with low loss.

I claim:

1. A radar system utilizing a single duplexing antenna arrangement, said system comprising:
    means for continously generating a transmission signal;
    an antenna that is operative to radiate the output of the generating means and to receive a target echo signal;
    means for coupling the output of said generating means to said antenna, said coupling means further having a target echo signal output port and being operative to couple said target echo signal from the antenna to said target echo signal output port, said coupling means having leakage of a component of the output of said generating means to said target echo signal output port;
    means for modulating the generating means to produce at the output of the generating means a transmission signal having a frequency which varies in a predetermined manner relative to time to cause a first predetermined difference between the instantaneous frequencies of the transmission signal and target echo signals appearing at said target echo signal output of said coupling means;
    means for attenuating signals at the target echo signal output port of the coupling means, said attenuating means being operable to attenuate a signal having a frequency within a known range of frequencies and having a power level which exceeds a predetermined threshold in excess of the expected power level of the target echo signal, said attenuating means also being operable to propagate with acceptable attenuation signals having a power level which is below said predetermined threshold and to propagate with acceptable attenuation signals which are of a frequency displaced from that of the signal above the threshold by a second predetermined frequency difference at least as great as said first predetermined difference, said attenuating means also being operable to attenuate a signal over a narrow frequency band at an instantaneous stop band center frequency coincident with the instantaneous frequency of the leakage of the radar transmission signal; and
    means for heterodyning a portion of the transmission signal and the signal at the output port of said attenuating means to produce a beat frequency signal.

2. A radar system in accordance with claim 1, wherein said attenuating means includes as an output stage thereof a variable frequency narrow band stop filter providing narrow band stop filter operation at an instantaneous stop band center frequency in response to the output of said modulating means, said stop filter having a control input connected to the output of said modulating means to cause said instantaneous stop band center frequency to coincide with the instantaneous frequency of the leakage component of the radar transmission signal.

3. Apparatus in accordance with claim 1, wherein said coupling means is a three-port duplexing circulator.

4. A power limiter for installation adjacent to a propagation path of microwave energy, said power limiter comprising:
    a periodic array of slab-like members made of narrow linewidth ferrite material and uniformly spaced in the direction of microwave signal propagation by a distance of one-fourth the apparatus operation wavelength, each slab-like member of said array forming first and second parallel faces disposed in transverse relationship to the direction of microwave energy propagation with the dimensions of said members between their respective first and second faces being less than one-fourth the apparatus operation wavelength, each member further forming an edge surface perpendicular to said faces with at least a portion of said edge surface being exposed to the microwave energy propagation path such that the direction of microwave energy propagation is tangential to said edge surface;
    means for applying a magnetic bias field to the slab-like members; and
    a variable narrow band stop filter having a central input, said stop filter providing narrow band stop filter operation at an instantaneous center frequency in response to a frequency control signal applied to the control input.

5. The power limiter of claim 4 wherein each slab-like member of the array is a rectangular bar having two opposite rectangular surfaces forming said first and second faces and having two opposite rectangular surfaces forming two planar edge surfaces, said power limiter further comprising:

a rectangular cross-sectioned waveguide for housing said periodic array of slab-like members, each of said slab-like members being mounted in the waveguide with one of its planar edge surfaces contiguous to one of the inner walls of the waveguide such that the planar edge surface opposite the edge surface contiguous to said one inner wall forms the edge surface exposed to the propagation path of the microwave energy, the area of each of said first and second faces of said rectangular bar occupying no more than one-half of the cross-sectional area of the waveguide.

6. The power limiter of claim 4 further comprising: slab-like members of dielectric material, said dielectric slab-like members shaped similarly to said ferrite slab-like members and disposed between each of said ferrite slab-like members.

7. The power limiter of claim 4 wherein said means for applying a magnetic bias field includes means for generating a bias field parallel to the direction of the electrical field of the propagating microwave energy.

8. The power limiter of claim 4, wherein said means for applying a magnetic bias field includes means for generating a bias field in the direction of propagation of the microwave energy.

9. A receiver protector comprising:
a first periodic array of narrow linewidth ferrite elements presenting a spin wave surface to a path of propagation of microwave energy, said first array of ferrite elements providing spin wave power absorption effects in the subsidiary mode of spin wave resonance of narrow linewidth ferrite material to attenuate microwave energy within a known frequency range which energy has a power level above a first predetermined threshold and which is incident on said spin wave surfaces, said first periodic array being operative to pass, with attenuation levels acceptable for effecting receiver protector operation, microwave energy having a power level which is below said first predetermined threshold and microwave energy which is of a frequency displaced from that of above-threshold incident microwave energy within the known frequency range by a predetermined frequency difference; and a variable narrow band stop filter having a control input, said stop filter providing narrow band stop filter operation at an instantaneous center frequency in response to a frequency control signal applied to the control input.

10. The receiver protector of claim 9 further comprising:
a second periodic array of narrow linewidth ferrite elements presenting a spin wave surface to a microwave energy propagation path, said second array of ferrite elements providing spin wave power absorption effects in the subsidiary mode of spin wave resonance of narrow linewidth ferrite material to attenuate microwave energy within a known frequency range which energy has a power level above a second predetermined threshold and which is incident to said spin wave surfaces, said second periodic array being operative to pass, with attenuation levels acceptable for effecting receiver protector operation, microwave energy having a power level which is below said second predetermined threshold and microwave energy which is of a frequency displaced from that of above-threshold incident microwave energy within the known frequency range by a predetermined frequency difference, said first and second arrays of ferrite elements being cascade-connected in the direction of microwave energy propagation with the second array responsive to the output of the first array; and means for concentrating the magnetic field of incident microwave energy coupled to the ferrite member operatively associated with each ferrite element of said periodic array such that said second predetermined threshold is less than said first predetermined threshold.

11. The receiver protector of claim 10, wherein said concentrating means comprises a magnetic field shaping element made of a permitivity dielectric material disposed adjacent to the ferrite member.

12. The receiver protector of claim 11, wherein the first periodic array includes slab-like shaped ferrite elements, each element being disposed such that its slab faces are in transverse relationship to the direction of microwave energy propagation, said slab-like shaped elements further forming an edge surface perpendicular to said faces, at least a portion of said edge surface being exposed to the microwave energy propagation path such that the direction of microwave energy propagation is tangential to said edge surface, and wherein the second periodic array includes spherically shaped ferrite elements, and wherein the magnetic field shaping element includes a disk disposed in transverse relationship to the direction of microwave energy propagation, said disk having an opening at its center for receiving one of said spherically shaped ferrite elements.

13. The receiver protector of claim 12, wherein
said first periodic array includes means for providing spin wave power absorption of an incident microwave frequency signal over a power level range extending between an upper capability of the order of 20 watts to a lower threshold of an approximate range of 0.2 to 3.0 watts; and wherein said second periodic array includes means for providing spin wave power absorption of incident signals over a power level range extending from an upper capability of the order of 3.0 watts to a lower threshold of the order of 2.0 milliwatts.

14. The receiver protector of claim 9 for use in a radar system in which the frequency of the radar transmission signal is controllably varied by a radar system transmitter frequency control means, wherein the control input of said narrow band stop filter is connected to the output of said transmitter frequency control means to cause the instantaneous center frequency to coincide with that of the radar transmitter frequency to attenuate reflections of said radar transmission signal resulting from antenna impedance mismatch.

15. A power limiter for installation adjacent to a propagation path of microwave energy, said power limiter comprising:
a periodic array of slab-like members made of narrow linewidth ferrite material and uniformly spaced in the direction of microwave signal propagation by a distance of one-fourth the apparatus operation wavelength, each slab-like member of the array being an arcuate disk fragment having two opposite surfaces forming first and second parallel faces disposed in transverse relationship to the direction of microwave energy propagation, with the dimensions of said slab-like members between their respective first and second faces being less than one-fourth the apparatus operation wavelength, said arcuate disk fragment further forming an edge surface perpendicular to said faces with at least a portion of said edge surface being exposed to the microwave energy propagation path such that the direction of microwave energy propagation is tangential to said edge surface;

means for applying a magnetic bias field to the slab-like members; and a circular cross-sectioned waveguide forming a housing for said periodic array of arcuate disk fragments, each of said arcuate disk fragments being mounted in the waveguide with a portion of said edge surface matching a predetermined arcuate portion of the inner circumference of the waveguide contiguous to the inner wall, and with the remainder of said edge surface providing an outwardly convex curve which matches the shape of the family of isopotential electric field lines of the characteristic mode of microwave energy propagation through the circular cross-sectioned waveguide such that the outwardly convex curve shaped edge surface forms the edge surface exposed to the microwave energy propagation path, the area of each of the two opposite faces of said arcuate disk fragments occupying less than the full cross-sectional area of the waveguide.

16. A power limiter for installation adjacent to a propagation path of microwave energy, said power limiter comprising:

a periodic array of slab-like members made of narrow linewidth ferrite material and uniformly spaced in the direction of microwave signal propagation by a distance of one-fourth the apparatus operation wavelength, each slab-like member of said array forming first and second parallel faces disposed in transverse relationship to the direction of microwave energy propagation, with the dimensions of said members between their respective first and second faces being less than one-fourth the apparatus operation wavelength, each member further forming an edge surface perpendicular to said faces with at least a portion of said edge surface being exposed to the microwave energy propagation path such that the direction of microwave energy propagation is tangential to said edge surface;

means for applying a magnetic bias field to the slab-like members; and slab-like members of dielectric material, said dielectric slab-like members being shaped similar to said ferrite slab-like members and disposed between each of said ferrite slab-like members such that the edge surfaces of the ferrite members that are exposed to the microwave energy propagation path cooperation with corresponding edge surfaces of the dielectric members to form a common surface having a smoothness on the order of plus or minus 100 Angstroms.

* * * * *